United States Patent [19]

Folkert de Vries

[11] Patent Number: 5,381,409
[45] Date of Patent: Jan. 10, 1995

[54] METHOD AND INSTALLATION FOR SWITCHING PACKETS

[75] Inventor: Rein J. Folkert de Vries, Leidschendam, Netherlands

[73] Assignee: Koninklijke PTT Nederland N.V., Groningen, Netherlands

[21] Appl. No.: 92,286

[22] Filed: Jul. 15, 1993

Related U.S. Application Data

[63] Continuation of Ser. No. 678,685, Apr. 1, 1991, abandoned.

[30] Foreign Application Priority Data

Apr. 3, 1990 [NL] Netherlands .................. 9000780

[51] Int. Cl.$^6$ ........................................ H04L 12/56
[52] U.S. Cl. .................................................. 370/60
[58] Field of Search ............... 370/60, 94.1, 61, 58.1, 370/85.6, 85, 84; 340/825.5, 825.51, 825.52

[56] References Cited

U.S. PATENT DOCUMENTS

| | | | |
|---|---|---|---|
| 4,864,560 | 9/1989 | Quinguis et al. | 370/60 |
| 4,872,159 | 10/1989 | Hemmady et al. | 370/85.6 |
| 4,922,487 | 5/1990 | Eilenberges et al. | 370/60 |
| 5,016,245 | 5/1991 | Lobjinski et al. | 370/60 |
| 5,084,871 | 1/1992 | Carn et al. | 370/60 |
| 5,126,999 | 6/1992 | Munter et al. | 370/60 |
| 5,128,913 | 7/1992 | Yamanaka et al. | 370/61 |
| 5,179,552 | 1/1993 | Chao | 370/60 |
| 5,197,064 | 3/1993 | Chao | 370/60 |

FOREIGN PATENT DOCUMENTS

| | | |
|---|---|---|
| 0339735 | 11/1989 | European Pat. Off. |
| 0339735A1 | 11/1989 | European Pat. Off. |
| 0340841A1 | 11/1989 | France |

OTHER PUBLICATIONS

"Integrated Services Packet Network Using Bus Matrix Switch", IEEE Journal on Selected Areas in Communications, vol. SAC-5, No. 8, Oct. 1987.

*Primary Examiner*—Douglas W. Olms
*Assistant Examiner*—Dang Ton
*Attorney, Agent, or Firm*—Frishauf, Holtz, Goodman & Woodward

[57] ABSTRACT

The invention relates to a method for switching packets, which are transferrable by transmission cells and comprise a control code, in a switching system having a number of inputs and a number of outputs, from the input at which the packet appears to a specific output derived from the control code of the packet. The invention provides that the packets appearing at the inputs are fed, via a number of first transmission channels containing first transmission cells, to a number of second transmission channels, containing second transmission cells, leading to the outputs of the switching system, a packet of this type transferred by a first transmission cell always being transmitted to the next sequential transmission cell, which is not already occupied by another packet, of that second transmission channel which leads to the specific output derived from the control code.

7 Claims, 5 Drawing Sheets

METHOD AND INSTALLATION FOR SWITCHING PACKETS

This application is a continuation, of application Ser. No. 07/678,685, filed Apr. 1, 1991, now abandoned.

BACKGROUND OF THE INVENTION

1. Field of the invention

The invention relates to a method for switching packets, which are transferable by transmission cells and comprise a control code, in a switching system having a number of inputs and a number of outputs, from the input at which the packet appears to a specific output derived from the control code of the packet. The invention also relates to a switching system in which this method can be pre-eminently carried out.

2. Prior art

A method and switching system as indicated above is known from U.S. Pat. No. 4,937,814, referenced under C, discloses a switching system comprising junction switches for transferring data packets from a first bus to a second bus. The junction switch comprises a translation memory for translating packet addresses into new addresses, a comparator for selecting the packets that are to be routed to the second bus, a packet queue memory for storing selected packets until an insertion circuit, after receiving an empty packet code (EPC), places such stored packet in the first arriving empty slot on the other bus by means of a serial/parallel (shift) register.

Another method and switching system as indicated above is disclosed, inter alia, in the publication indicated under C. In this publication a so-called "knockout"-switch is described with which it is possible to route packets, which are transferred via "time slots"-'—hereinafter termed transmission cells—and which, in addition to their information content, are also provided with a control code, through the switching system from an arbitrary input of the switching system to that output which is indicated by the control code—directly or indirectly—as output destination.

A significant problem in switching systems of the knockout type is the congestion which occurs as soon as packets intended for the same output arrive simultaneously at different inputs. Without an a priori control of the arrival of packets, this problem is unavoidable, while it is precisely the implementation of such a control which makes a switching system appreciably complex. Both the known "knockout" switch and the method and the switching system according to the invention aim to solve this problem using means which are as simple and as effective as possible and which, moreover—because of the large number of inputs and outputs in practice and the desired possibilities for expansion therein—are suitable for a modular architecture. In the method disclosed in the said publication, use is made of so-called "2 2-contention switches" for the concentration of the packets collected. These switches have two inputs and two outputs which are controlled by a "busy bit", which (optionally temporarily) forms part of the control code of the packets. If a packet arrives at the left-hand input, this packet is signalled by reading out the "busy bit" and the left-hand input and the left-hand output are connected to one another, as are also the right-hand input and the right-hand output, and the packet is switched from the left-hand input to the left-hand output, while a packet which may arrive at the right-hand input at the same time is switched to the right-hand output. If an inactive "busy bit" is read out at the left-hand input, which indicates that a packet is not present at that input at that point in time, the right-hand input is connected to the left-hand output, while the left-hand input and the right-hand output are inactive. A packet which may be present at the right-hand input is then thus switched to the left-hand output. In the known switching system a large number of these "contention switches" are assembled to give "concentrators", with which all inputs of the switching system are connected and which each—via a number of output buffers—open into a single output. Packets appearing at the inputs are concentrated, after their control code has been read in "packet filters" by means of the "contention switches" towards a series of internal outputs and then, via the said buffers, to a single (external) output, the output of the switching system derived—directly or indirectly—from their control code.

SUMMARY OF THE INVENTION

It is an object of the present invention to provide a switching method which is suitable for making a larger VLSI implemented switching system ("ATM Switch Fabric"), comprising a multiplicity of "ATM Switch Elements" (ASEs). Those ASEs are called "junction switches" in the above cited Weldink U.S. patent and they reside in the crossings of the matrix formed by first and second buses.

In the known switching system the transmission speed of the datacells transmitted by the first bus and the transmission speed of the datacells transmitted by the second bus have the same value. For an acceptable low blocking chance, the input buffer memory in the prior art switch is a 'queue memory in the form of an elastic buffer' which has to be a rather large size (estimated capacity about 200 packets).

The present invention is based on the understanding that it is advantageous to minimize buffer capacity in the crossings of the switch matrix and to concentrate the necessary buffer capacity to the output edge of the switch matrix. A further understanding is that such output buffering can be accomplished by speeding-up the bitrate in the second transmission channel (bus). Minimum buffer capacity in the crosspoints and concentrating buffer capacity at the output-end of the matrix rows results in simpler and smaller crosspoints which enable larger switches (more crosspoints on one switch chip). Besides, concentrating the buffer capacity enables easier buffer control. Finally, it is understood that in practice it is not necessary to speed-up the bitrate of the shift register by a factor equal to the number of input channels, which would result in a fully blocking-free operation but which would require a impossible high bitrate (clock frequency). Contrary to that, it is found that in practice a speed-up factor of 8 or 12 results in only a very small, acceptable blocking chance. Further, it is found that it is preferred to use a parallel shift register (parallel-in, parallel-out) instead of a 1-bit register (parallel-in, serial-out) as is used in a completely different known switch which is called a "Knock-out Switch" and is cited above and listed below as reference. By using such parallel shift register, after converting the packets arriving at the switch input and having a serial bit structure, into packets having a parallel bit structure, in the system of the invention those parallel packets are inserted into the shift register in parallel and, at each clock pulse they are shifted through in parallel towards the (parallel) shift register output. This has the advantage that the clock frequency does not need to be extremely high, while the bitrate is multiplied by the parallel/serial word width ratio. If, as an example, the bitrate of the serial input packets is 155 Mbit/s, then a speed-up factor of 8 can be accomplished by converting those packets (having a word width of 1 bit) into parallel packets having a word width of 8 bits and inserting them in parallel into a 8-bits wide shift register, having a clock frequency of 155 MHz, resulting in a throughput bitrate in the shift register of 8*155=1240 Mbits/s. A reduction of the clock frequency can be achieved by converting those serial packets, arriving at the input of the switching system, into parallel packets having a greater word width than 8, for instance 16. In that case the clock frequency can be reduced to 155/2=77.5 MHz, the throughput bitrate remaining 1240 Mbits/s (77*5*16) and the speeding-up factor remaining 8 (1240/155).

The result of said speeding-up is the opportunity to concentrate the buffer capacity at the edge of the switch matrix. Packet buffers thus concentrated at the output side of the shift registers are fed with packets having a parallel bit structure of say 16 bits at a clock speed of 77.5 MHz are read-out on its output side in a serial way with a clock speed of 155 MHz, resulting in serial outgoing packets having a word width of 1 bit and a bitrate of 155 Mbits/s, and thus having the same structure and bitrate as the original incoming packets.

In practice, the capacity of the input buffers still needed in the matrix crossings can be limited to only 2 packets. The capacity of the output buffers will be about 200 packets, about the same size as the queue memories in the switch matrix crossings of the state-of-the-art switching system. However, in the known switching system such buffer reside in every crossing, while in the switching system according to the present invention, as a result of speeding-up the shift register throughput, those buffers only reside at the output end of every matrix row.

In addition to the abovementioned method according to the invention, with the various options, the present invention also provides a switching system—in particular intended to enable implementation of said method—having a number of inputs and a number of outputs, for switching packets, which are transferable by transmission cells and comprise a control code, from the input at which such a packet appears to a specific output derived from the control code of said packet, which switching system is characterised by, per output ($U_1$... m) of the switching system, at least one transmission element (11), such as a shift register or a bus, for shifting, under the control of a clock signal, transmission cells from its input ($SI_x$) in the direction of its output ($SU_x$), which output is connected via a buffer (B) to the relevant output ($U_x$) of the switching system, which transmission element also comprises further inputs ($S_1$... n) extending in the shift direction, which inputs are connected to, on the other hand, control elements (10) which are connected to the relevant inputs ($I_1$... n) of the switching system and which, on the one hand, detect the output destination ($U_1$... m) of packets originating from the inputs of the switching system and which, on the other hand, detect whether or not a transmission cell appearing at the relevant input of the transmission element is already occupied by a packet, the control element switching a packet originating from the input of the switching system to the relevant transmission-element input if it detects that the control code of said packet originating from the input of the switching system indicates as destination that specific output ($U_x$) of the switching system which corresponds to the output of the switching system to which the transmission element is connected and if it also detects (b) that the first subsequent transmission cell appearing at the input of the transmission element is not already occupied by another packet. For the abovementioned preferred serial/parallel conversion, the switching system according to the invention also preferably provides a serial/parallel conversion element (14) for converting the packets which originate from the inputs ($I_1$... n) of the switching system and have a serial nature and a first word width into packets which have a more parallel nature and have a second word width which is greater than the first. In order to ensure that the form in which the packets appear at the outputs of the switching system is the same as that at the inputs thereof, the switching system according to the invention preferably also provides a parallel/serial conversion element for converting the packets which originate from the transmission element (11) and have a parallel nature and have the said second word width into packets which have a serial nature and a third word width which is the same as the said first word width of the packets appearing at the inputs ($I_1$... n) of the switching system. A preferred embodiment provides that the said parallel/serial conversion element is formed by the said buffer (B) between the output ($SU_x$) of the transmission element (11) and the relevant output ($U_x$) of the switching system, which buffer, on the side of the transmission element, is read in in parallel manner with the parallel packets originating from the transmission element and, on the side of the output of the switching system, is read out in serial manner.

Finally, it is also pointed out that a switching system according to the invention is outstandingly suitable for a modular construction, in the sense that any extension of the switching system can be realised without the need to intervene in the already existing construction, which is the case when expanding the said known switching system. A switching system according to this embodiment of the invention can, for example, be formed of concentration modules (12), each of which comprise a number of the said transmission elements (11) and control elements (10), and also buffer modules (13), each of which comprise a number of the said buffers (B), which concentration modules, with one another and with the buffer modules, form a matrix, the inputs (I1 ... n) of the switching system on the one hand always being connected in part to the inputs of a series of concentration modules and the concentration modules, on the other hand, being connected to one another in series, the outputs of the final concentration module of such a series of concentration modules connected to one another being connected to the inputs of a buffer module, the outputs of which buffer module are connected to a group of outputs of the switching system and all of these groups of outputs together forming the outputs (U1 ... n) of the switching system.

REFERENCES

[1] U.S. Pat. No. 4,937,814 [WELDINK/AT&T PHILIPS, 90.06.26].

[2] Yeh, Y. S.; Hluchyj, M. G.; Acampora, A. S.; The Knockout Switch: A Simple, Modular Architecture for High-Performance Packet Switching; IEEE J. Selected Areas in Comm., SAC-5, 8 (Oct. 1987), 1274–1283.

ILLUSTRATIVE EMBODIMENTS

DESCRIPTION OF THE EMBODIMENTS

Figure 1:
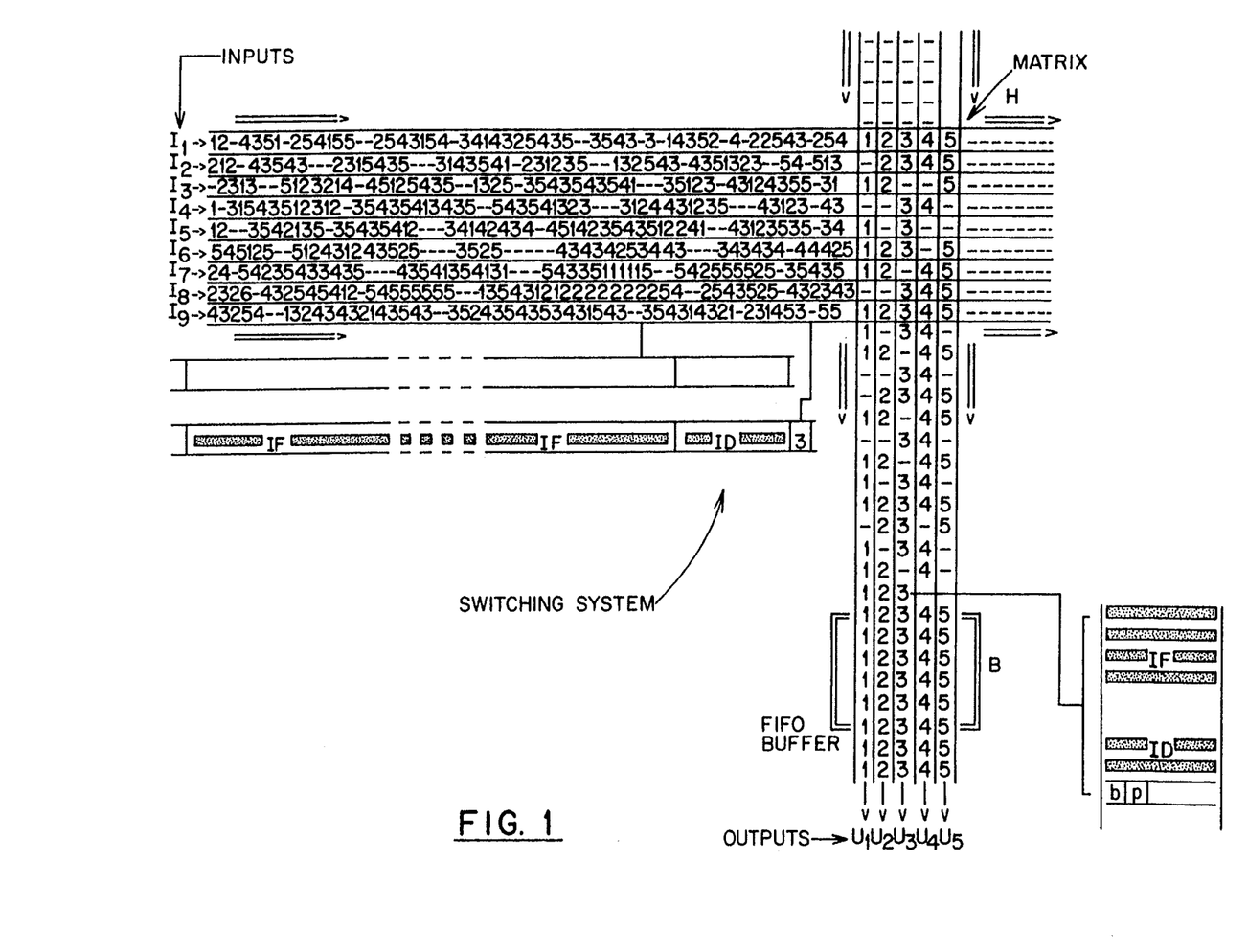
FIG. 1 gives a representation of the method according to the invention.

In FIG. 1 a number of inputs of a switching system of the type referred to above is indicated by $I_1 \ldots n$. Packets are supplied to these inputs, which packets are, as it were, transported by the abovementioned first transmission cells and are indicated in the Figure by the numbers $1 \ldots 5$, which numbers indicate the respective outputs for which said packets are intended (in practice the number of inputs and the number of outputs will usually be much larger than is indicated in this Figure). Two of these first transmission cells are indicated in more detail in the Figure; the uppermost cell is a transmission cell which is unoccupied, that is to say a packet is not incorporated therein, and the lowermost cell in the Figure is a first transmission cell which is "filled" with a packet. The packet shown comprises, from right to left, an indication of the output to which this packet must be routed, in this case output 3, an identification code for this packet ID and, in addition, the information content of the packet IF. Each of the packets (and first transmission cells) have a serial nature (appear in serial form). In practice, a packet of this type can be, for example, 436 bits long, including the (temporary) output indication. Via the first transmission cells, the packets are fed to a matrix M, where they are transferred to second transmission cells. Empty second transmission cells are supplied to the matrix M, as can be seen at the top. These empty transmission cells are, respectively, intended for the outputs $1 \ldots 5$. In the matrix M a packet from the first transmission cell is transferred to a second transmission cell insofar as this transmission cell was not already occupied by another packet and—of course—insofar as this transmission cell leads to the output which corresponds to the destination output of the packet. The destination is indicated, as explained above, in the packet itself; in the present example this is the datum on the far right of the packet. After the transfer of the packet to a second transmission cell, this destination information is removed again from the packet.

As indicated above, it is also possible to allow a packet to be taken over by the second transmission cells not only if a second transmission cell is empty but also if this second transmission cell is indeed filled with a packet but this packet has a lower priority than the packet which is supplied by means of a first transmission cell and then if—as a consequence of a continuing supply of packets to the same output—blocking (congestion) threatens to occur. In this option it is necessary that the priorities of the packets are known. Preferably, space is reserved in the control code ("header") for this purpose. The destination indication, priority indication and identification code as a whole form the control code of a packet. However, the destination code is only of temporary nature and is only valid for the particular switching system. The control code can also, for example, additionally comprise an error code and a designator. In the Figure it can be seen that all of the packets originating from the various inputs $I_1 \ldots n$, i.e. insofar as there is capacity for these in the matrix, are transferred to the second transmission cells which lead to the various outputs $U1 \ldots 5$. The packets having the destination output 1 are all fed to this output, the packets having destination output 2 are all fed to said output 2, etc. It can be seen in the Figure that the transmission direction of the first transmission cells crosses the transmission direction of the second transmission cells in the direction of the outputs. In connection with the limitation of the transmission speed of the second transmission cells, the serial packets are converted into (more) parallel (for example 8-bit) packets before they are transferred from a first transmission cell to a second transmission cell. Said second transmission cells thus also have a parallel nature. This is shown in more detail for one of the second transmission cells, filled with a packet intended for output 3, on the right of the Figure. The packet shown comprises, for example, 54 octets, the first (lowermost) of which comprises a "busy bit" b, which indicates that the transmission cell is occupied by a packet. Furthermore, the first octet can comprise, for example, one or more bits p which indicate the priority category of said packet, which, as mentioned, can play a role if there is a threat of blocking.

After the packets have been concentrated in the matrix in the direction of their respective outputs, the information flows to said outputs are yet further "compressed" with the aid of a FIFO buffer B. In order to give the packets the same appearance as they had at the input of the switching system, they are read out as serially at the bottom of the FIFO buffer B. In addition to removing empty transmission cells ("compression"), the buffer B thus also acts as a parallel/serial converter.

Figure 2:
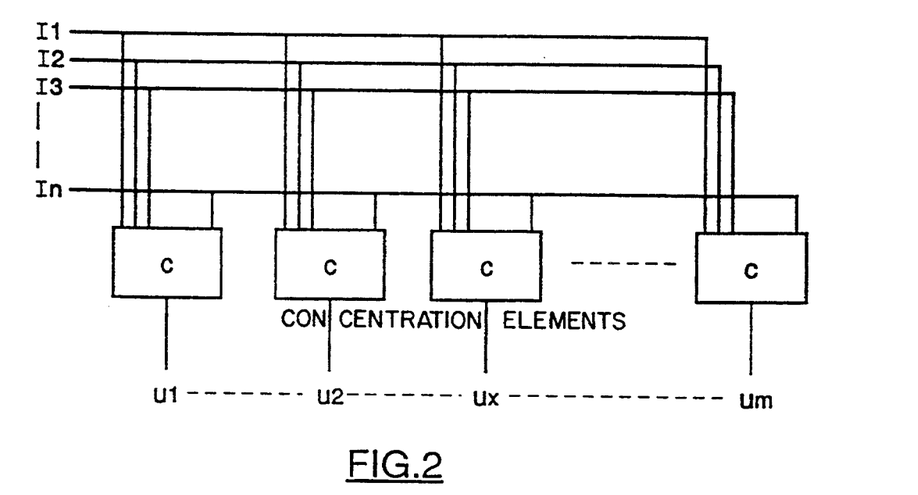
FIG. 2 gives an outline representation of a switching system of the type referred to (not specific to the invention).

FIG. 2 gives an outline representation of a switching system of the type referred to in this application, which system, incidentally, is not specific for the present invention but corresponds to a Figure in the publication mentioned under C. The Figure indicates a system in which a connection is made from a number of inputs $I_1 \ldots n$ to a number m of concentration elements C. Each of these concentration elements concentrates the packets, originating from the inputs $I_1 \ldots n$, in the direction of its output $U_1 \ldots m$.

Figure 3:
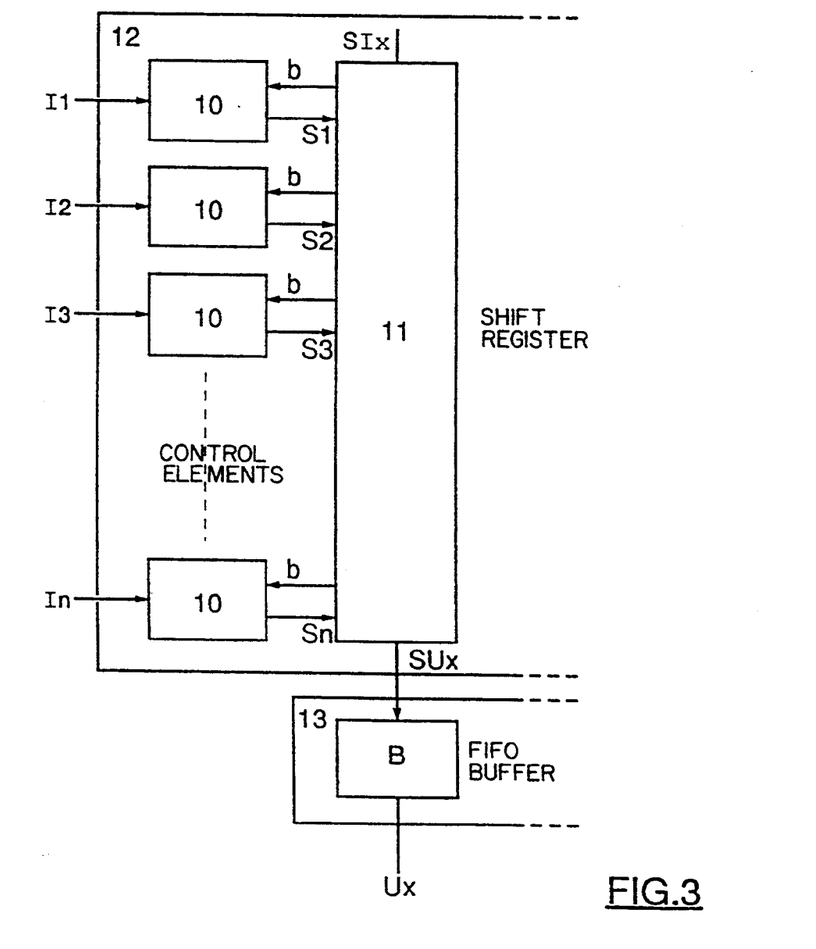
FIG. 3 gives a diagrammatic representation of the functioning of the switching system according to the invention.

FIG. 3 shows diagrammatically a concentration element C of this type. The most important component of this concentration element C is a shift register 11, which provides the matrix function, indicated in FIG. 1, for one output $U_x$. In the shift register 11, transmission cells are shifted, under the influence of a clock signal, from its [sic] (primary) input $SI_x$ to its [sic] output $SU_x$. The input $SI_x$ of the transmission element 11 shown in this Figure is not connected to another element (in FIG. 6, which is still to be discussed, the transmission element 11 forms part of the uppermost row of concentration modules 12), as a result of which the transmission cells of the shift register 11 are empty initially (at the top). Whether or not packets are transferred is controlled by a number of control elements 10, which are incorporated between the various inputs $I_1 \ldots n$ and various (secondary) inputs $S_1 \ldots n$ of the shift register 11. This control element 10 is shown in more detail in FIG. 4. Packets which appear at the inputs $I_1 \ldots n$ are fed via the said first transmission cells to the various control elements 10. In these control elements, the output number (and, possibly, the priority classification) of the packets is detected. If this output number corresponds to the output with which the shift register is connected, the control element attempts to transfer the packet to the shift register. This transfer will usually take place only if a (second) transmission cell in the shift register is empty, i.e. not already occupied by another packet. If a packet has not yet been transferred to the shift register 11 (because no free second transmission cell has yet appeared) and a new packet, intended for the same output $U_x$ as the packet waiting in the control element 10, is already supplied from one of the inputs $I_1 \ldots n$, the control unit 10 will have to remove the packet which was first to arrive or the packet which was last to arrive. The control unit 10 is set for the first or the second option. Another possibility would also be, in such a case, to sacrifice not the waiting packet or the subsequent packet but the packet with which the next second transmission cell is filled at that instant. Thus, a choice must be made from the three packets mentioned. If, which technically is also possible, not one but several packets can be buffered in the control unit 10 and the buffer threatens to become full as a result of a large influx, from the inputs, of packets having the same output destination, a choice must be made from even more (than three) packets; usually it will be elected to sacrifice the first packet incorporated in the buffer or the last packet supplied. If the packets comprise priority indications, use can be made of these by, for example, allowing that packet of the said three packets (the packet in the next second transmission cell, the waiting packet and the packet which arrived last) to be lost which has the lowest priority. This sacrifice of one packet is thus the case only if there is a threat of blocking; if there is no threat of blocking, a packet can remain waiting in the control element 10 until an empty transmission cell presents itself in the shift register 11.

In the Figure it can be seen that the packets which are collected (concentrated) by the shift register 11 in the direction of the relevant output $U_x$ are stored in a FIFO buffer B connected to the output $SU_x$ of the shift register, by which means it is achieved that only the second transmission cells filled with packets appear at the output $U_x$ (if the buffer B is empty, empty transmission cells will, of course, be supplied). The buffer B is serially "emptied" at the bottom, as a result of which the packets regain their original, serial appearance.

Figure 4:
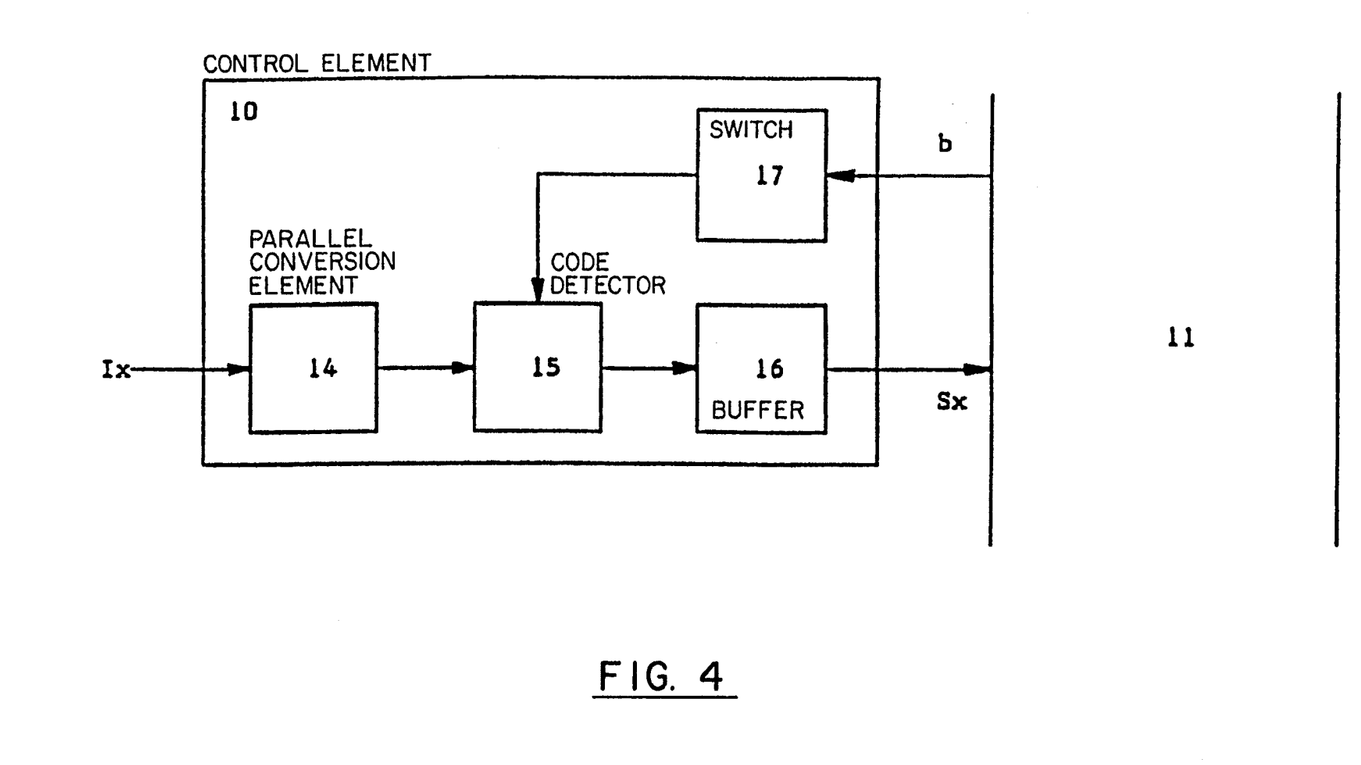
FIG. 4 shows a detail from the representation in FIG. 3.

FIG. 4 shows a control element 10 elaborated in more detail. In addition to the abovementioned functions of the control element 10, this element also ensures that the serial packets, transferred by means of serial first transmission cells from the input, are converted into (more) parallel (for example 8-bit-wide) packets in order, as explained above, to obtain a reduction in transmission speed, which is proportional to the "processing width" of said packets. Thus, if the serial packets are converted into, for example, 8-bit-wide packets, as is shown in FIG. 1, the transmission speed of this conversion will have decreased by a factor of 8. This serial/parallel conversion takes place in the serial/parallel conversion element 14. After the conversion, the packet is transferred to a code detector 15, where (inter alia) the number of the output for which the packet is intended is read out. If the packets are also provided with a priority indication, this is also read out in this code detector 15. The control element 10 is further provided with a buffer 16, in which a packet—if this is intended for the relevant output—is temporarily stored, awaiting transfer of such a packet to an available transmission cell of the shift register 11. The actual control of the transfer of a packet to a transmission cell of the shift register 11 takes place in a switch element 17, which checks whether the transmission cells of the shift register 11 passing in succession are or are not occupied. If there is a threat of blocking—if a packet is offered from an input to the control device 10 which, on reading out its output destination in the code detector 15, intended [sic] for incorporation in the same shift register 11, while the previous packet is still in the buffer 16—the priorities of the three said packets (for which there are only two places, i.e. one in the buffer 16 and one in the next transmission cell of the shift register 11) are compared with one another, if the packets have priority indications, and the packet having the lowest priority is sacrificed.

If the switch element 17 determines that the offered packet does indeed have to be incorporated in the passing transmission cell of the shift register 11, a control signal is given to the buffer 16 as a result, after which the packet which is stored in said buffer is transferred to the transmission cell of the shift register 11. The buffer 16 is then available again for accepting packets which arrive subsequently and are intended for the relevant output.

Figure 5:
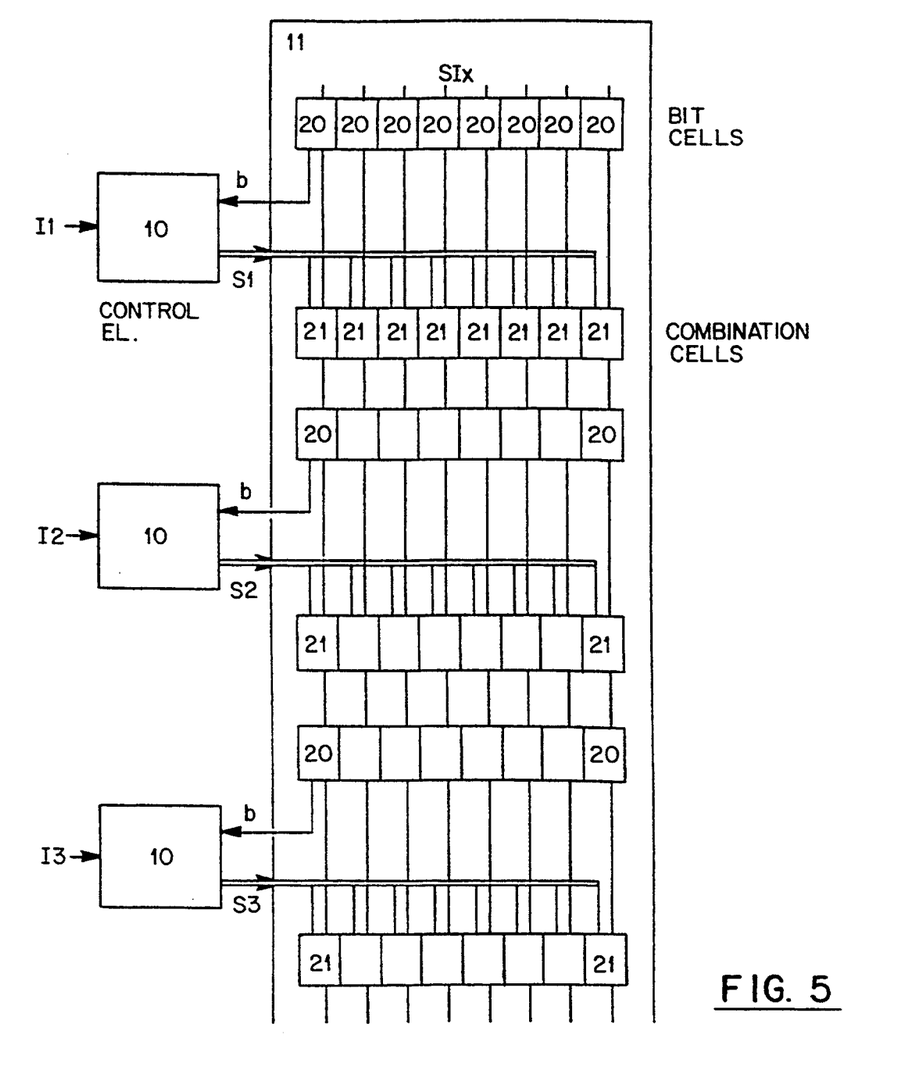
FIG. 5 gives a more detailed representation of the construction and functioning of a transmission element designed as a shift register.

FIG. 5 shows an 8-bit-wide packet (thus consisting of a number, for example 54, of octets), corresponding to that in FIG. 1, which packet is transferred downwards by means of a (second) transmission cell through the shift register 11. The successive octets of a packet are buffered in bit cells 20 (1-bit buffer cells) and, under the control of a clock signal which is not indicated in more detail, shifted on, via a number of combination cells 21 (OR gates) to the following series of bit cells 20. If, in the meantime, a packet has arrived at one of the inputs, for example at input $I_2$, which packet is stored in the buffer 16 indicated in FIG. 4, the relevant control element 10 waits until the start of an empty transmission cell presents itself in the previous bit cells 20 before transmitting this packet. Whether or not the next transmission cell is full or empty is indicated by its "busy bit". After having checked, by means of "busy bit" detection, that the next transmission cell is empty, the control element 10 of input $I_1$ transmits the packet stored therein to the combination cells 21 connected to said input, as a result of which the packet "fills" the empty transmission cell successively, octet by octet. Under the influence of the clock signal of the shift register 11, the packets are shifted in this way by the bit cells and combination cells of the shift register 11.

Figure 6:
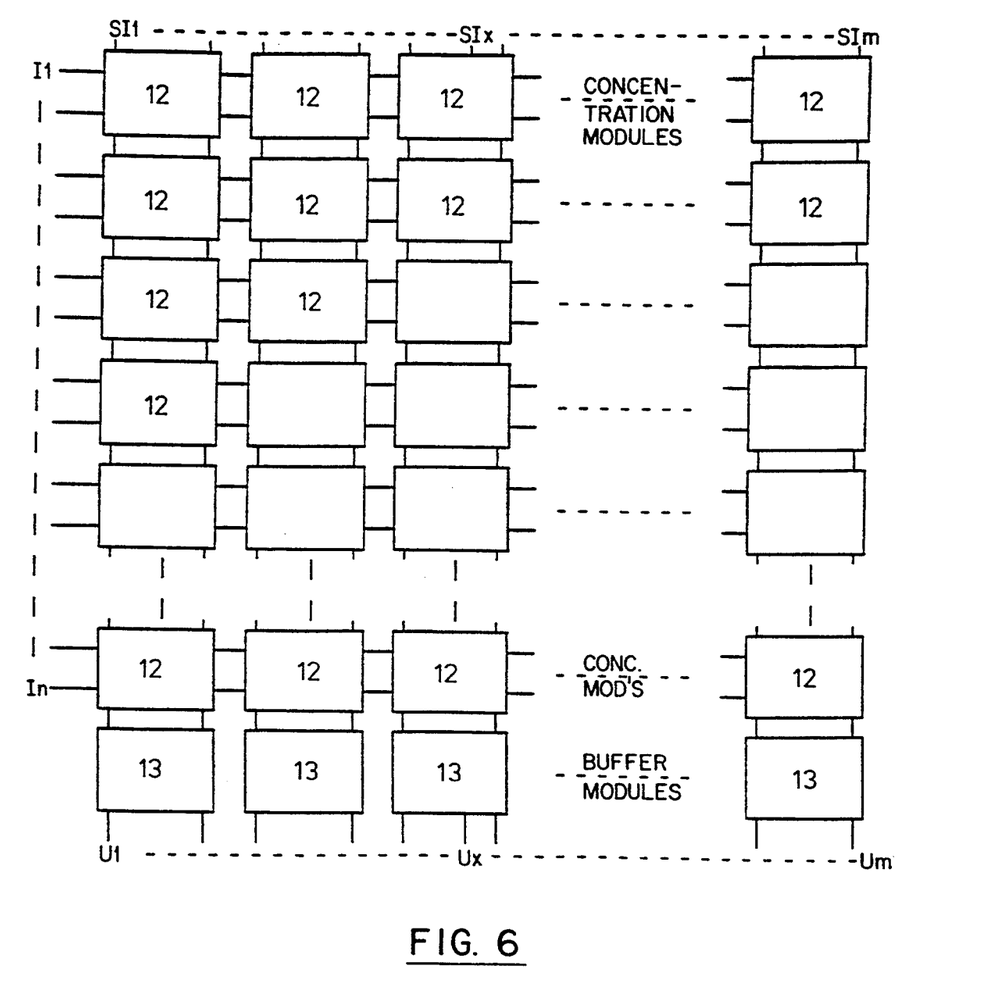
FIG. 6 shows an illustrative embodiment of the switching system according to the invention of modular design.

FIG. 6 shows the architecture of a switching system according to an illustrative embodiment of the invention, consisting of a large number of concentration modules 12 and a number of buffer modules 13 connected thereto. The concentration modules 12 consist of a number of the combinations of the control element 10 and the shift register 11 which are shown in FIG. 3. Since these elements 10 and 11 are the same for all inputs and outputs (in other words at each location in the switching system), several of these element combinations 10–11, for a number of inputs and outputs, as shown in the Figure, can be designed as a VLSI module, the switching system then, in turn, comprising several said VLSI modules. The same also applies in the case of the buffer shown in FIG. 3, a number of which buffers, in FIG. 5, are always assembled to give a buffer module 13 and the switching system, in turn, comprising several said buffer modules. It can be seen in the Figure that some of the total number of inputs $I_1 \ldots n$ are always connected to the relevant connections of different concentration modules 12. As can be seen in FIG. 3, the shift registers 11 (with their control element 10) are located in these concentration modules 12, each shift register opening into one of the buffers B which is part of a buffer module 13. The outputs of the buffer modules together form the outputs $U_1 \ldots m$ of the switching system.

I claim:

1. Method for switching, in a switching system, data packets each comprising a control code, said switching system comprising a number of inputs and a number of outputs, said packets being transferable from that one of said inputs at which such packet arrives, to one of said outputs, that one of said outputs being selected by said control code, each of said packets being transmitted, via one of a number of first transmission channels containing first transmission cells having a first transmission speed, to one of a number of second transmission channels, containing second transmission cells having a second transmission speed greater than said first transmission speed, said one of a number of second transmission channels leading to said selected output of the switching system, characterized in that said second transmission speed (s2), expressed in bits per second, at which the second transmission cells are transmitted, is equal to the product of a constant (L) and said first transmission speed (s1), expressed in bits per second, at which the first transmission cells are transmitted, said constant (L) being equal to a positive simple proper fraction of the number of said inputs (n) of the switching system, and said second transmission speed is used only within said switching system, the output of said switching system, like the input thereof being at said first transmission speed.

2. Method according to claim 1, characterized in that for a finite number of said inputs (n) which is at least 8, said constant (L) is between 5 and 25.

3. Method according to claim 1, characterized in that said first transmission cells have a serial nature with a first word width and said second transmission cells have an entirely parallel nature with a second word width which is greater than said first word width.

4. Method according to claim 3, characterized in that the ratio between said second transmission speed (s2) of said second transmission cells and said first transmission speed (s1) of said first transmission cells, both transmission speeds being expressed in bits per second, is equal to the ratio between said second word width and said first word width, both word widths being expressed in bits.

5. Method according to claim 3, characterized in that packets being transmitted by said second transmission cells towards said selected output, are converted back into packets having a serial nature a with a word width which is equal to said first word width.

6. Switching system comprising a number of inputs and a number of outputs, for switching data packets having a serial nature and each data packet comprising a control code, from one of said inputs at which such packet arrives to one of said outputs, that one of said outputs being selected by said control code, comprising for each (Ux) of said switching system outputs (U1 ... m) a transmission element (11) having an input (SIx) and an output (SUx), for shifting, at a second transmission speed (s2) greater than said first transmission speed, second transmission cells from said transmission element input towards said transmission element output, which transmission element also comprises further inputs (S1 ... n) extending between said input and said output, said further inputs being connected to control elements (10) which, on another side, are connected for detecting the control code of each arriving packet at said input (I1 ... n) of the switching system, and for each of said switching system inputs (I1 ... In), a serial/parallel conversion element (14) for converting, at a first transmission speed (s1), packets originating from said respective switching system inputs (I1 ... n) of the switching system and having a serial nature and a first word width, into packets which have a parallel nature and a second word width which is greater than said first word width, characterized in that said second transmission speed (s2), in bits per second, of said second transmission cells in said transmission element (11) is equal to the product of a constant (L) and said first transmission speed (s1), which constant is equal to a positive simple proper fraction of the number of said inputs (n) of the switching system, and said second transmission speed is used only within said switching system, the output of said switching system, like the input thereof being at said first transmission speed, and said system is further characterized in that said system comprises a parallel/serial conversion element for converting packets having a parallel nature and said second word width and originating from said output (SUx) of the transmission element (11) into packets which have a serial nature and a word width which is equal to said first word width, said parallel/serial conversion element being formed by a packet buffer (B) being connected between said output (SUx) of said transmission element and said selected output (Ux) of the switching system, which packet buffer, on the side thereof connected to said transmission element, is loaded in a parallel manner with said parallel packets originating from the output of said transmission element and, on the side of the output of the switching system, is read out in a serial manner, the packets read out having a word width equal to said first word width.

7. Switching system according to claim 6, characterized in that said system comprises:

concentration modules (12), each comprising a number of said transmission elements (11) and a number of said control elements (10), and also packet buffer modules (13), each comprising a number of said packet buffers (B), said concentration modules forming a matrix with one another and with said packet buffer modules, the inputs (I1 ... n) of said switching system on the one hand being connected to the inputs of an array of said concentration modules and said concentration modules, on the other hand, being connected to one another in series, the outputs of the final concentration module of such a series of concentration modules connected to one another being connected to the inputs of said packet buffer module, the outputs of which are connected to a group of outputs of the switching system and all of these groups of outputs together forming said outputs (U1 ... m) of said switching system.

* * * * *

UNITED STATES PATENT AND TRADEMARK OFFICE
CERTIFICATE OF CORRECTION

PATENT NO. : 5,381,409
DATED : January 10, 1995
INVENTOR(S) : Folkert de Vries

It is certified that error appears in the above-indentified patent and that said Letters Patent is hereby corrected as shown below:

Column 9, line 65 (claim 5), after "nature", delete "a" (second occurrence)

Signed and Sealed this

Sixteenth Day of January, 1996

Attest:

BRUCE LEHMAN

*Attesting Officer*     *Commissioner of Patents and Trademarks*